Oct. 9, 1923.

C. S. HALL

AIRCRAFT PROPELLER

Filed May 16, 1922

1,470,163

Charles S. Hall.
INVENTOR.

BY Daniel N. Clark
ATTORNEYS.

Patented Oct. 9, 1923.

1,470,163

UNITED STATES PATENT OFFICE.

CHARLES S. HALL, OF LOS ANGELES, CALIFORNIA.

AIRCRAFT PROPELLER.

Application filed May 16, 1922. Serial No. 561,512.

*To all whom it may concern:*

Be it known that I, CHARLES S. HALL, a citizen of the United States, a resident of Los Angeles, in the county of Los Angeles and State of California, have invented a new and useful Improvement in Aircraft Propellers, of which the following is such a clear and exact specification embodying the invention in its preferred form as will enable others skilled in the art to which it appertains to make and use the same.

My invention relates to an improvement in aircraft propellers and has for one of its objects to provide a simple means whereby the air resistances found at, near, and around, the axis of the propeller when in forward motion through the air, can be eliminated, or greatly reduced, and the air otherwise impinging upon, around and near, the axis may be quantitatively diverted at both an angular and peripheral velocity, and this velocity affording a means of deriving an additional thrust from the propeller blades at a point of most efficient pitch-line relatively near the periphery of the said propeller.

Another object of my invention is to provide a means of structural reinforcement of the propeller, as a whole, at, near and around, the axis thereof, whereby great thrust and gyrational strains may be withstood without involving its destruction by centrifugal forces.

Another object is to provide a structural means whereby the thrust of the propeller, in operative rotation at high velocities, will quantitatively utilize the full power of the engine developed involving forward velocities commensurate with the pitch-line of the blades of the propellers.

Another object is to provide the most efficient thrust of the propeller developed on the most efficient pitch-line of the blades at the greatest radial distance from the axis of the propeller involving the greatest peripheral velocity as well as the most efficient pitch-line.

This application is made as an improvement over my present application filed December 13th, 1921, for aircraft propellers, Serial #522,206.

Having thus briefly enumerated the objects of my invention, I will now describe the same with reference to the accompanying drawings and the indicating numerals found thereon, all of which form an essential part of this specification.

Figure 1:
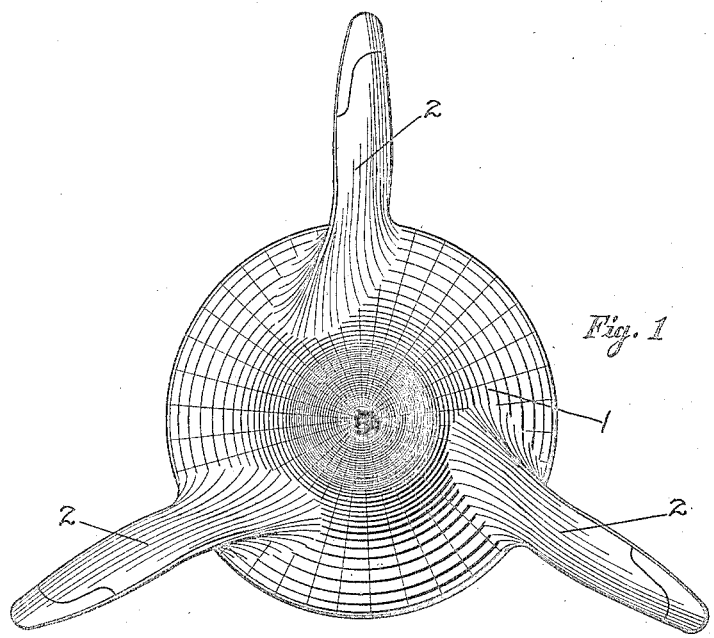
Figure 1 is a plan view of the propeller showing the relative arrangement of the central cone and the blades attached thereto.
Figure 2:
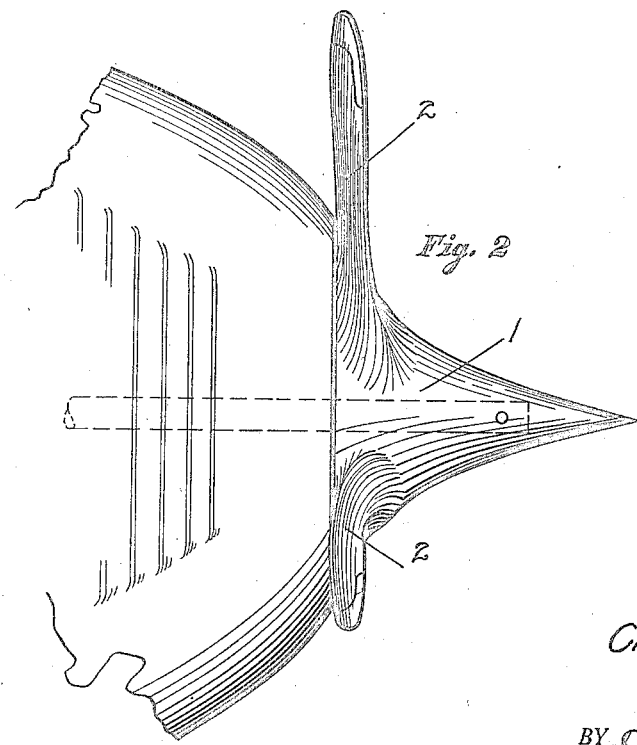
Figure 2 is a side view of the propeller in operative position upon the fuselage of the aircraft, which fuselage is fragmented.

In carrying out my invention in its preferred form, as shown in the said drawings, a central pelecoidal cone is provided having the apex thereof forwardly extending from a radial line established by the blades of the said propeller. This cone has a curvilinear surface, in profile, gradually accentuating away from the longitudinal axis of the said cone 1 and gradually subtending towards the radii at the base thereof; the lines of the said surface are catenizations emanating from the longitudinal axis, as shown in the profile view in Figure 2. Attached to the base of the said cone 1, and made integral therewith and radially extending therefrom, propeller blades 2 are arranged, as shown in both figures.

Now it will be seen that in operative relation, as the thrust produced by the propeller blades acting upon the air as a result of its rotation, a flow of air is established which impinges upon the central conic portion 1 of the said propeller. This air-stream will be gradually moved away from the longitudinal axis as the same approaches the base of the cone, at which time it is discharged in front of the blades at high angular and peripheral velocities. As the angular velocity is towards a radial line established at the base of the said cone, the directional change induced thereon by the pitch of the propeller blades will greatly enhance the thrust produced by the propeller, as a whole.

Of course it is understood that various changes may be made in the adaption of the cone and the propeller blades as well as the union thereof at the point of attachment of the said blades to the said cone without departing from the spirit of this invention.

Attention is called to the fact that in the present application the spiral veins shown in connection with my application filed December 13th, 1921, Serial #522,020, are eliminated in this improvement.

Having thus described the objects of my invention, in its preferred form, what I claim and for which I desire to secure Letters Patent are as follows:—

1. An aircraft propeller comprising a centrally located pelecoidal cone portion having a profile with its apex forwardly extending from the radial line established by the base thereof; the said cone having a relatively smooth surface, except at the juncture of the blades, and extending backwardly from the apex along a gradually accentuating curve subtending towards a radial line established at the base of the said cone; and propeller blades outwardly extending from the base of the said cone, the said blades having their beginning in protuberances of gradually increasing proportions from a relatively wide surface area of the cone until the said protuberances are increased in definiteness coinciding with the blades, and forming bases for the said blades.

2. An aircraft propeller, in combination a centrally located cone of pelecoidal shape having a relatively smooth surface except at the juncture of the blades with the said cone, blades radially extending from the said cone and having their inception in protuberances of relatively wide area upon the surface thereof, which protuberances gradually increase in definiteness and decrease in diameter until they coincide with, and form a base of, the blades of the said cone of the said propeller.

3. In an aircraft propeller, the combination of a centrally located cone portion having a relatively smooth surface, the apex thereof forwardly extending from the line of the propeller blades, the surface having a curvilinear profile of gradually accentuations away from the longitudinal axis; propeller blades radially extending from the base of the said cone, the said blades having their bases formed by gradual protuberances drawn upon the surrounding surface of the said cone.

4. In an aircraft propeller, the combination of a forwardly apexed cone portion having a profile of apposed catenary lines and a surface relatively smooth except for protuberances drawn therefrom and outwardly extending until the said protuberances become a base for and coincide with the propeller blades thereon.

In testimony whereof I have signed my name to this specification.

CHARLES S. HALL.